Patented June 26, 1923.

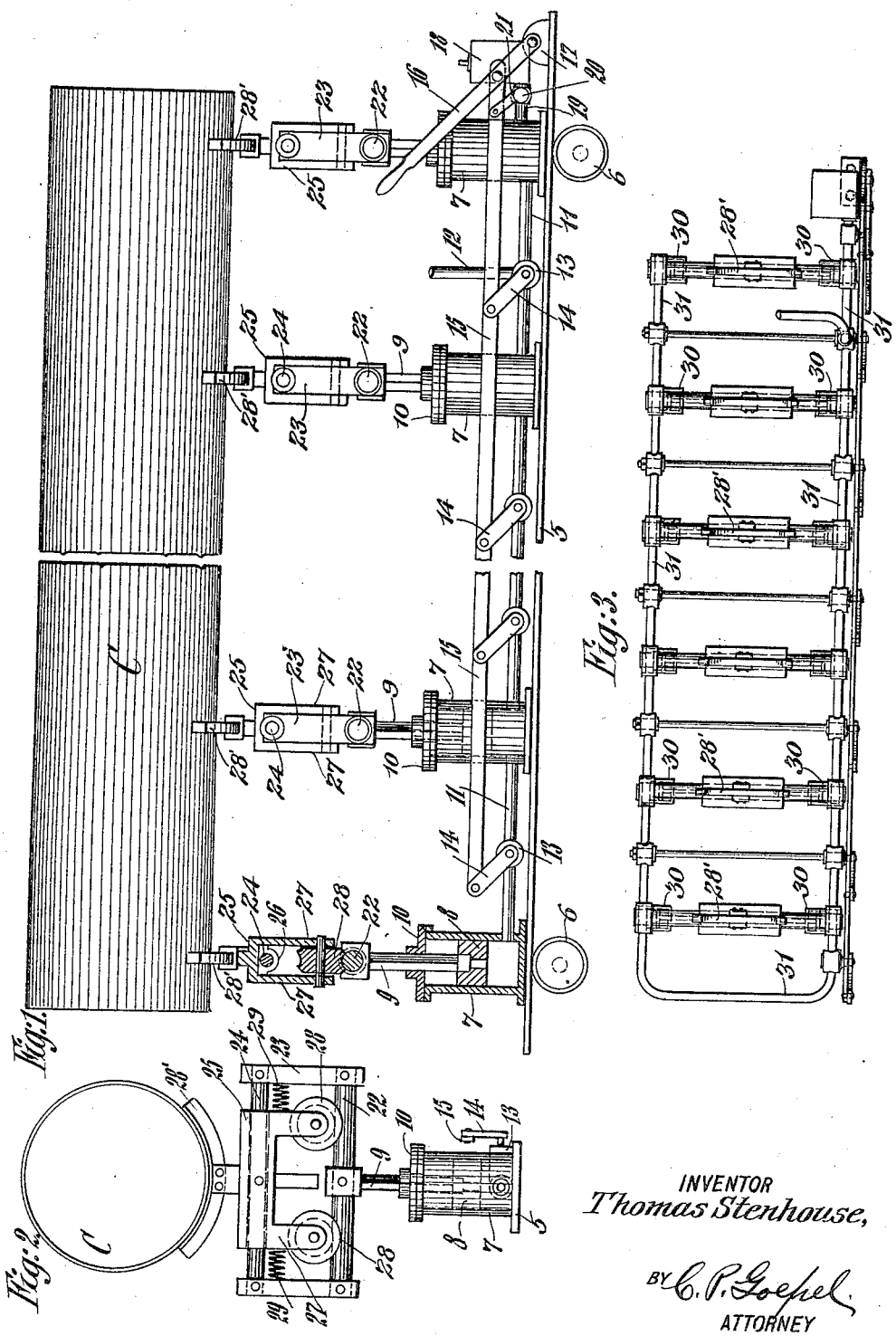

1,460,286

UNITED STATES PATENT OFFICE.

THOMAS STENHOUSE, OF WASHINGTON, PENNSYLVANIA, ASSIGNOR, BY DIRECT AND MESNE ASSIGNMENTS, OF ONE-SIXTH TO ALEXANDER L. DUVAL D'ADRIAN, OF WASHINGTON, PENNSYLVANIA, AND ONE-SIXTH TO BERNHARD F. DRAKENFELD, JR., OF NEW YORK, N. Y.

METHOD OF AND APPARATUS FOR SUPPORTING GLASS CYLINDERS.

Application filed November 25, 1919. Serial No. 340,630.

*To all whom it may concern:*

Be it known that I, THOMAS STENHOUSE, a citizen of the United States, residing in the town and county of Washington, State of Pennsylvania, have invented new and useful Improvements in Methods of and Apparatus for Supporting Glass Cylinders, of which the following is a specification.

This invention relates to an improved method and apparatus for supporting glass cylinders in position to be cut or severed into a plurality of sections.

In the art of glass making, and particularly window glass, the molten glass is drawn from the pot by means of a bait in the form of a cylinder. Heretofore, this glass cylinder has been horizontally supported upon a series of spaced supporting units, each of which constitutes an independent support for one part of the cylinder. It frequently happens that the cylinder is not of uniform diameter throughout its length, or at different places may be laterally bent or curved. In such instances, only a few of the supporting units in the series will bear the whole weight of the cylinder, while the others will not contact therewith. In cases where the cylinder is curved to such an extent as to place a portion of the cylinder under considerable strain when engaged on the supports, the cylinder will break, and fly into numerous pieces. Another objection to such cylinder supports, where no provision is made for lateral movement, resides in the fact that the cylinder may be so bent that, when it is lowered upon the arms of the supports, the end of one or more supporting arms may contact with the side of the cylinder. This invariably results in the fracture and destruction of the cylinder.

It is the primary purpose and object of my present invention to provide a novel method and apparatus for the support of glass cylinders whereby the objections above referred to may be wholly obviated. To this end, I utilize a non-compressible medium for exerting a sustaining influence upon the cylinder at spaced points, and distribute this sustaining influence throughout the length of the cylinder, so as to compensate for inequalities in the surface, or variations in the diameter, or curvature of different parts of the cylinder. The present improvement further contemplates the provision of a series of supporting units, each having a cylinder and a piston operating therein, together with means for establishing communication between said cylinders for the supply of a fluid medium thereto, and for cutting off such communication, and a transversely movable support for the glass cylinder, mounted upon each piston, whereby the vertical plane of application of the sustaining pressure of the fluid medium to the glass cylinder is maintained in a central vertical plane throughout the length of the cylinder.

With the above and other objects in view, the invention consists in the improved method and apparatus for supporting glass cylinders, as above characterized, and in the form, construction, and relative arrangement of the several parts of the apparatus, as will be hereinafter more fully described, illustrated in the accompanying drawings, and subsequently incorporated in the subjoined claims.

In the drawings wherein I have illustrated several forms of apparatus, whereby the purpose of the present invention may be attained in a satisfactory manner, and in which similar reference characters designate corresponding parts throughout the several views, Fig. 1 is a side elevation partly in section, showing the improved support with a glass cylinder mounted in position thereon.

Fig. 2 is an end elevation.

Fig. 3 is a top plan view showing a slightly modified form of the apparatus.

Referring in detail to the drawings, 5 designates a platform, which is mounted upon spaced trucks 6, whereby the apparatus may be conveniently moved.

A plurality of spaced cylinders 7 are secured upon the platform 5. In each of these cylinders a piston 8 reciprocates, and is fixed to the lower end of a piston rod 9, extending through the cylinder head 10.

The several cylinders 7 at their lower ends are connected to each other by the pipes 11, and a non-compressible fluid medium, such as water or oil, is supplied through the pipe 12 and the several pipes 11 to said cylinders. In each of the pipes 11, between the spaced cylinders, a valve 13 is arranged, and is provided with an arm 14. One of these valves also controls communication between the supply pipe 12 and one of the pipes 11. The valve arms 13 are pivotally connected to a common connecting rod 15, which, at one of its ends, is pivotally connected to a lever 16, fulcrumed at its lower end, as shown at 17, upon a bracket fixed to the platform 5. A chamber 18 is also arranged upon the platform 5, and is adapted to receive compressed air. This chamber is connected by the pipe 19 to one of the end cylinders 7 in the series. A valve 20 in said pipe is operatively connected by an arm 21 to the connecting rod 15, so that said valve will be actuated simultaneously with the valves 13.

To the upper end of each piston rod 9, a transverse, cylindrical rod 22 is rigidly fixed intermediate of its ends. Upwardly extending yoke bars 23 are secured to the opposite ends of the rod 22, and said bars are connected at their upper ends by a rod 24.

25 designates a transversely movable carriage, which straddles the rod 24, and is centrally provided with a bearing 26, having sliding engagement on said rod. The carriage at its opposite ends is formed with depending arms 27, between which the peripherally grooved rollers 28 are journalled. These rollers travel freely upon the upper side of the rod 22. A saddle arm 28' is arranged above the carriage 25, and centrally fixed thereto. In these saddle arms of the several supporting units, the glass cylinder indicated at C is adapted to be seated. As shown in Fig. 2 of the drawings, coiled springs 29 are interposed between the ends of the carriage 25 and the yoke bars 23. These springs normally act to centralize the carriage upon the support, so that the transverse center line of the saddle arm 28' is in coinciding relation with the axis of the piston 8.

The piston rods 9 are preferably square or rectangular in form, so as to prevent their rotation in the cylinder heads, and thus obviate all possibility of turning movement of the supports mounted upon the respective pistons.

In operation, the several valves 13 are opened, so as to admit the non-compressible fluid medium through the pipes 11 to the several intercommunicating sylinders 7. This fluid medium acts to urge the pistons 8 upwardly in the respective cylinders to the same level, when no weight is imposed upon the supporting saddles 28. The fluid medium acts against the air cushion in the cylinder 18, and when the glass cylinder C is positioned upon the supporting saddles 28, this fluid medium instantly responds to any variation or inequality in the surface of the cylinder and pressure of the different portions thereof upon the respective supporting saddles. Thus, each of the supporting units has a dependent relation to every other unit in the series, so that the weight of the cylinder is uniformly distributed between the several supporting units, and they thus each bear an equal share of the load, irrespective of variations in diameter, surface, contour, or curvature in the cylinder length.

Different portions of the cylinder may be transversely bent or curved to different degrees, but as the saddle arms 28 may shift transversely with respect to the individual supports, they will automatically adjust themselves to such abnormalities in the cylinder. It is, therefore, impossible that the ends of the saddle arms may exert such a severe local pressure upon the glass cylinder as to result in its fracture.

After the glass cylinder has thus been positioned upon the supporting units, and the weight thereof equally distributed between these units, the several valves 13 and the valve 20 are simultaneously closed. Communication between the cylinders is thus shut off, and the non-compressible fluid medium below the piston in each cylinder will serve to maintain the pistons and the supports mounted thereon in the positions to which they have been moved. In other words, the supports are practically locked in a stationary position. This fact obviates possible breakage of the cylinders when they are cut into sections of a desired length. Such supports as heretofore employed for this purpose, are yieldingly sustained by means of springs. When the cylinder is arranged upon the supporting units, the springs compress until the resistance of the spring is equal to the weight of the cylinder. Although the weight of the cylinder may in this manner be more or less equally distributed upon the independent supporting units, when the cylinder is cut into lengths, the short severed section on one support will be forced upwardly by the reaction of the spring. This frequently happens before there has been a complete severance, thereby resulting in fracture. This condition is aggravated when the greater part of the weight of the cylinder devolves upon one end support, owing to a bend or curve in the cylinder. In such case, the edges of the severed section will forcibly collide with the opposed edges of the remaining length of the cylinder, and thereby start a fracture, which results in the destruction of the entire cylinder. It will be readily seen that I have successfully overcome these disadvantageous features of such supporting apparatus as heretofore provided, and that by the closure of the valves 13, the cylinder will remain quiescent both during and subsequent to its severance into sections. It will, of course, be understood that the weight of the cylinder sections is sufficient to counteract the tendency of the springs 29 to centralize the carriages 25 upon the respective supports, which would result in a transverse movement of the partially severed section with relation to the cylinder. In other words, these springs are only of sufficient strength to move the carriage to its central position when there is no weight thereon, and to cushion the transverse movements of the carriage on the support.

In Fig. 3 of the drawings, I have illustrated a slightly modified form of the apparatus, wherein, in lieu of the springs 29, I provide the cylinders 30 arranged at the opposite ends of each carriage 25, and within the supporting frame. In each cylinder 30 a piston operates and is connected to the end of the carriage 25. The several cylinders are in communication with each other, being connected by the pipes 31, and a non-compressible fluid medium is supplied to the intercommunicating cylinders, and said supply controlled by means of valves arranged and operated in identically the same manner as above referred to in connection with the cylinders 7. It will thus be seen, that the same means which is provided for locking the pistons 8 in their vertically adjusted positions, may also be employed for locking the carriages 25 in the positions to which they may be moved transversely upon the supporting frames by the curved or bent sections of the glass cylinder. With either arrangement referred to, it will be apparent that the severed cylinder sections will be positively sustained or supported, both vertically and transversely, so that fracture of the glass and breakage of the cylinder lengths will not take place.

From the foregoing description considered in connection with the accompanying drawings, the construction, manner of operation, and several advantages of my invention will be clearly and fully understood. The apparatus, as herein described, will be positive and reliable in its action, and may be manufactured at comparatively small cost. It is manifest, of course, that a greater or less number of the supporting units may be provided, as desired, and that these supporting units may be used with otherwise mounted supporting saddles for the glass cylinder, instead of the transversely movable saddles above referred to, and that the valves 13 may also be of any described number. Accordingly, it is to be understood that the several terms and expressions herein employed, are used as terms of description, and not of limitation, and that it is not my intention by the use of such terms and expressions to exclude from the purview of my invention the various mechanical equivalents for the features of the apparatus shown and described, since it is apparent that this apparatus might be exemplified in numerous other structural modifications. Therefore, I expressly reserve the right and privilege of resorting to all such legitimate changes as may be fairly embodied within the spirit and scope of my invention, as claimed.

I claim:

1. A method of supporting glass cylinders to be severed into sections which consists in utilizing the weight of the cylinder to adjust points of support to inequalities in the cylinder and subsequently locking said points of support against yielding and while under tension.

2. A method of supporting glass cylinders to be severed into sections which consists in utilizing the weight of the cylinder to adjust points of support to inequalities in the cylinder and subsequently locking said points of support against yielding and while under tension and flexed.

3. A method of supporting glass cylinders to be severed into sections which consists in utilizing the weight of the cylinder to tension and flex a resilient support and subsequently locking said support against movement under the weight of the cylinder and while the support is tensioned and flexed.

4. A method of supporting glass cylinders to be severed into sections, which consists in subjecting the cylinder at spaced points to the influence of a common sustaining medium, and maintaining such sustaining influence of the medium at the several spaced points fixed during and subsequent to the severance of the cylinder into sections.

5. A method of supporting glass cylinders to be severed into sections, which consists in sustaining the cylinder in a horizontal position by subjecting the underside of the cylinder at spaced points to the influence of a confined non-compressible fluid medium, and maintaining such sustaining influence of the medium at the several spaced points fixed during and subsequent to the severance of the cylinder into sections.

6. A method of supporting glass cylinders to be severed into sections, which consists in subjecting the cylinder at spaced points to the influence of a common sustaining medium, and transversely shifting such spaced points of application of the sustaining influence relative to the normal longitudinal axis of the cylinder, to cause such sustaining influence to act in a central vertical plane upon different portions of the cylinder, regardless of relative differences in diameter or contour of such cylinder portions.

7. A method of supporting glass cylinders to be severed into sections, which consists in subjecting the cylinder at spaced points to the influence of a common sustaining medium, transversely shifting such spaced points of application of the sustaining influence relative to the normal longitudinal axis of the cylinder, to cause such sustaining influence to act in a central vertical plane upon different portions of the cylinder, regardless of relative differences in diameter or contour of such cylinder portions, and maintaining such sustaining influence of the medium at the several spaced points fixed during and subsequent to the severance of the cylinder into sections.

8. A method of supporting glass cylinders to be severed into sections, which consists in subjecting the cylinder at spaced points to the influence of a confined non-compressible fluid medium, transversely shifting such spaced points of application of the sustaining influence of the fluid medium, relative to the normal longitudinal axis of the cylinder, to cause such sustaining influence to act in a central vertical plane upon different portions of the cylinder, regardless of relative differences in diameter or contour of such cylinder portions, and maintaining such sustaining influence of the fluid medium at the several spaced points fixed during and subsequent to the severance of the cylinder into sections.

9. A method of supporting glass cylinders to hold the same stationary during and subsequent to severance into sections, which consists in subjecting the cylinder in planes at right angles to each other, and at spaced points in the length thereof to the sustaining influence of a fluid medium.

10. A method of supporting glass cylinders to hold the same stationary during and subsequent to severance into sections, which consists in subjecting the cylinder both vertically and transversely and at spaced points in the length thereof to the sustaining influence of a fluid medium.

11. A method of supporting glass cylinders to hold the same stationary during and subsequent to severance into sections, which consists in subjecting the cylinder both vertically and transversely and at spaced points in the length thereof to the sustaining influence of a fluid medium, and maintaining such sustaining influence of the fluid medium at the several spaced points invariable during and subsequent to the severance of the cylinder into sections.

12. In a support of the character described, a plurality of spaced supporting units, a common means for equalizing the distribution of the weight of a load between said supporting units, and locking means for maintaining the supporting units in position when equalized.

13. In a support for glass cylinders, a plurality of spaced supporting units, each including a cylinder and a piston operating therein, a common fluid supply line connected to, and affording communication between the spaced cylinders, to cause the fluid to exert a variable sustaining influence upon the pistons in said cylinders to equally distribute the weight of a glass cylinder between the supporting units, and means to close communication between said piston cylinders, and thereby maintain the sustaining influence of the fluid medium invariable during and subsequent to the severance of the glass cylinder into sections.

14. In a support for glass cylinders, a plurality of spaced supporting units, each including a cylinder and a piston operating therein, supporting saddles for the glass cylinder, mounted upon and movable with the pistons, and means for supplying a fluid medium to the cylinders and retaining said medium beneath the pistons therein to sustain said pistons against movement under the weight of the glass cylinder.

15. In a support for glass cylinders, a plurality of spaced supporting units, each including a cylinder and a piston operating therein, cylinder supporting means mounted upon and movable with each piston, valves between the several cylinders, means for manually operating the valves to supply a fluid medium to the cylinders beneath the pistons, whereby the weight of the glass cylinder is equally distributed between the supporting units, and the valves subsequently closed to maintain the sustaining influence of the fluid constant in the respective cylinders.

16. In a support for glass cylinders, a plurality of spaced supporting units, each including a cylinder and a piston operating therein, a supporting saddle for the glass cylinder, mounted upon each of the pistons, and transversely movable relative to the axis of the cylinder, fluid supply means connecting and affording communication between the several cylinders, the fluid medium in the respective cylinders exerting a variable sustaining influence upon the pistons therein to equally distribute the weight of the glass cylinder between the supports, and manually operable valves for closing communication between said cylinders to maintain the sustaining influence of the fluid medium constant and lock the supports against vertical movement during the severance of the glass cylinder into sections.

17. In a support for glass cylinders, a fluid sustained series of cylinder supports, and means to control the sustaining influence of the fluid, and thereby equally distribute the weight of the cylinder between the supports, each support including a carriage to receive the cylinder and means for mounting said carriage for movement transversely relative to the longitudinal axis of the cylinder.

18. In a support for glass cylinders, a fluid sustained series of cylinder supports, and means to control the sustaining influence of the fluid, and thereby equally distribute the weight of the cylinder between the supports, each support including a piston and piston rod, a carriage mounted upon the upper end of the piston rod for movement transversely relative to the longitudinal axis of the cylinder, and a saddle on said carriage to receive the cylinder.

19. In a support for glass cylinders, a fluid sustained series of cylinder supports, and means to control the sustaining influence of the fluid and thereby equally distribute the weight of the cylinder between the supports, each support including a piston and a piston rod, a carriage mounted upon the upper end of the piston rod for movement transversely relative to the normal axis of the cylinder, a saddle on said carriage to receive the cylinder, and means acting to cushion the transverse movement of the carriage.

20. In a support for glass cylinders, a plurality of spaced supporting units, each including a cylinder and a support in operative connection with the cylinder, fluid supply means connecting and affording communication between the several cylinders, and establishing an automatic interdependent relationship between the body of fluid in the several cylinders, a plurality of valves to close communication between the several cylinders, and lock the supports in stationary position, and a common operating means for said valves to simultaneously and uniformly open and close the same.

In testimony that I claim the foregoing as my invention, I have signed my name hereunder.

THOMAS STENHOUSE.